United States Patent [19]

Bodner et al.

[11] 4,358,826
[45] Nov. 9, 1982

[54] APPARATUS FOR ENABLING BYTE OR WORD ADDRESSING OF STORAGE ORGANIZED ON A WORD BASIS

[75] Inventors: Ronald E. Bodner, La Grange, Ga.; Thomas L. Crooks, Rochester; Andrew H. Wottreng, Byron, both of Minn.

[73] Assignee: International Business Machines Corporation, Armonk, N.Y.

[21] Appl. No.: 164,714

[22] Filed: Jun. 30, 1980

[51] Int. Cl.³ .............................................. G06F 9/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,401,375 | 9/1968 | Bell et al. | 364/200 |
| 3,806,891 | 4/1974 | Eichelberger | 364/900 |
| 3,972,023 | 7/1976 | Bodner et al. | 364/200 |
| 4,023,023 | 5/1977 | Bourrez et al. | 364/200 |
| 4,023,142 | 5/1977 | Woessner | 364/200 |

*Primary Examiner*—Harvey E. Springborn
*Attorney, Agent, or Firm*—Donald F. Voss

[57] ABSTRACT

Addressing control apparatus is structured to provide either byte or word addressing of storage organized on a word basis. The storage address register is made shiftable whereby for byte operations, it is shifted, and the bit shifted out of the register is used for byte selection. The contents of the storage address register are used to address storage for both word and byte addressing, and no change is required. The storage access, however, for byte addressing takes place after the shift is completed and the timing is adjusted to account for the shift operation. Gate control logic is modified to facilitate the byte selection.

8 Claims, 17 Drawing Figures

APPARATUS FOR ENABLING BYTE OR WORD ADDRESSING OF STORAGE ORGANIZED ON A WORD BASIS

TECHNICAL FIELD

This invention relates to storage addressing control apparatus, and more particularly, to storage addressing control apparatus for enabling byte or word addressing of storage organized on a word basis where each word consists of two bytes.

In some computer systems, there is a need for storage to be organized according to different data widths. In the past, this need was satisfied by having two physically different storages such as set forth in U.S. Pat. No. 3,972,023. That type of arrangement requires two physically different storage cards. The present invention eliminates the need for having two physically different storages by organizing a single storage on a word basis and providing for either word or byte addressing. Thus, a single storage can appear to be organized on a byte or word basis.

The invention finds particular utility in small computer systems having control storage organized on a word basis where the control words are used for emulating variable length byte oriented instruction sets using byte-organized data.

BACKGROUND ART

In the past, storages had a one-byte address organization but a two-byte wide data path and the least significant bit of the storage address which is still a part of the byte address selects the high or low byte. Also, two-byte operations, particularly for I/O operations, were facilitated by the byte address but the least significant bit of the byte address must be zero. Additionally, for two-byte operations the address must be incremented by two and for one-byte operations the address had to be incremented by one. The present invention does not require that the least significant bit of the address be zero for two byte or word operations and incrementing is the same for byte addressing as it is for word addressing. Additionally, for a word or two-byte operation only one address is used up as contrasted to effectively using two addresses in the prior art arrangement. Also, when storage is organized on a byte basis, the even byte boundary locations must be observed when doing two-byte operations. That requirement does not exist when storage is organized on a word or two-byte basis. The present invention for direct addressing provides twice as much addressing compared to storages organized on a byte basis rather than a word basis. Hence, in the present invention, a 16-bit address can address 128K bytes of storage whereas in the instance where storage is organized on a byte basis an address of that size can only address 64K bytes of storage.

DISCLOSURE OF INVENTION

The principal object of the invention is to provide addressing of storage organized on a word or two-byte basis in word or byte mode. Another significant object of the invention is to provide this type of addressing control with minimal modification to a computer system already utilizing a storage organized on a word or two-byte basis.

These objects are achieved by decoding the storage instruction to determine whether the storage operation is in a word or byte address mode. For byte addressing, the address in the storage address register is shifted so that the least significant bit of the storage address is removed from the register and entered into a single-bit storage element. The timing control is made aware of the need for a shift during the one-byte address mode whereby the timing is modified to account for the shift operation. The one-byte address mode signal is also used to modify gate control for controlling the passage of a single byte to or from storage. For example, during a byte storage read operation, the byte address in the storage address register, after the shift occurs, becomes a word address for the word in storage which contains the byte being addressed. The word containing the desired byte is read from storage and the state of the least significant bit of the byte address which has been shifted from the storage address register and is now residing in a single bit storage element, is used to control gate input selection. During a byte storage write operation, the byte address in the storage address register after the shift occurs becomes a word address of the word location in storage which is to contain the byte to be written into storage. The state of the least significant bit of the byte address which has been shifted from the storage address register and is now residing in the single bit storage element is used to control gate input selection whereby the byte of data is written into the proper byte location within the word being addressed.

It should be noted that the byte address in the storage address register is incremented or decremented, but the incremented or decremented address is not returned to the storage address register before the shift occurs. The incremented or decremented address is saved in a work register in a stack of local storage registers. The incrementing or decrementing is the same for a byte address as it is for a word address.

BEST MODE FOR CARRYING OUT THE INVENTION

Figure 1:
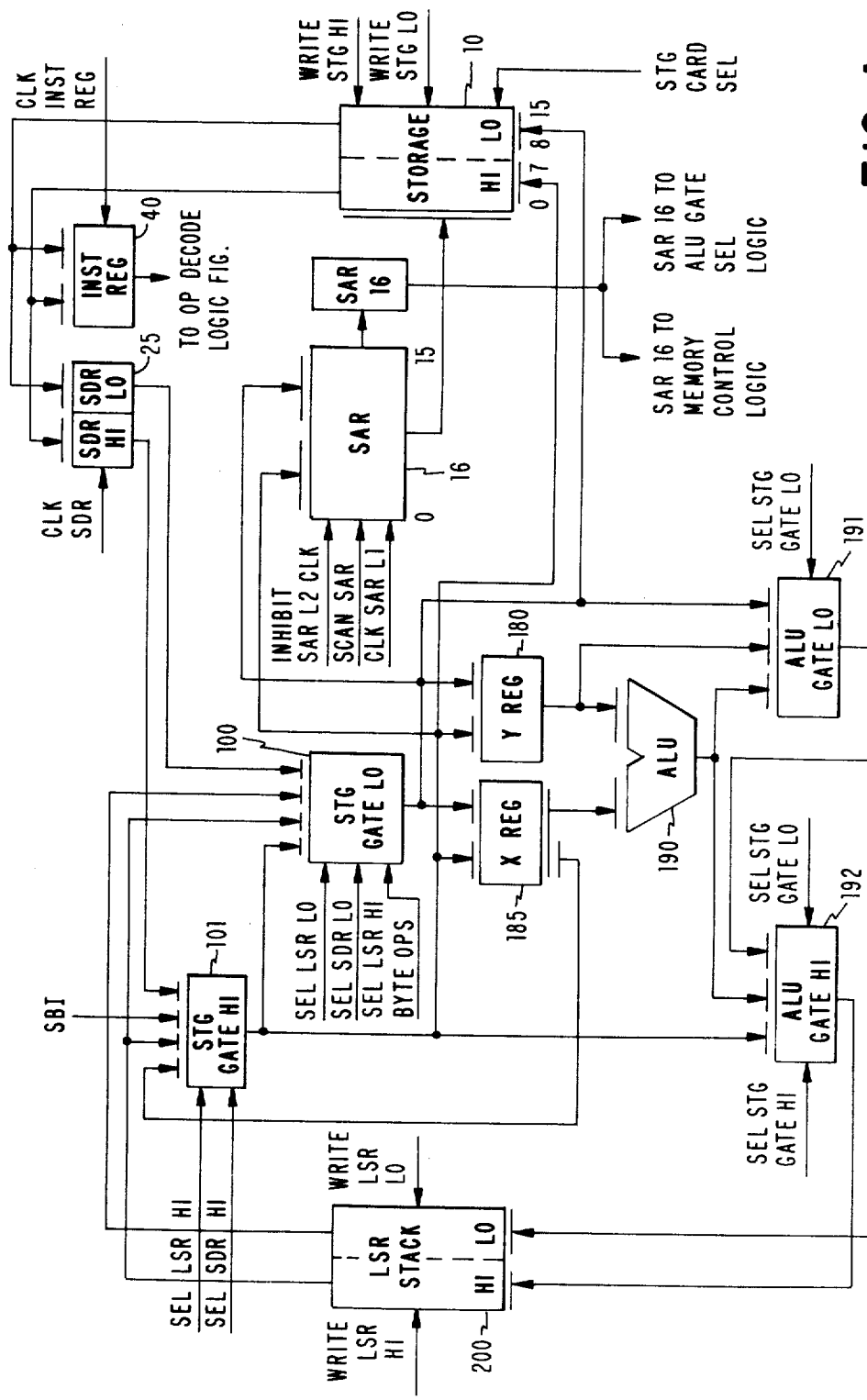
FIG. 1 is a schematic block diagram illustrating the invention incorporated in a computer system.

With reference to the drawings and particularly to FIG. 1, the invention is illustrated by way of example as being incorporated in a computer system similar to the computer system described in U.S. Pat. No. 3,972,023, Bodner, et al., dated July 27, 1976 for I/O Data Transfer Control System. In that computer system, control storage and main storage were separate storages. Also, in that system, the circuit technology is different from the circuit technology in the present invention and this difference manifests itself in different timings. Control storage 10, FIG. 1, in this particular example, is 16-bits wide and bits 0-7 inclusive represent a high byte and bits 8-15 inclusive represent a low byte and a word which consists of both a high and low byte contain bits 0-15 inclusive. The two byte word is provided to accommodate a 16 bit instruction set. Data and a variable length byte oriented instruction set which is emulated operates on a byte basis and therefor the requirement for byte mode.

Figure 7:
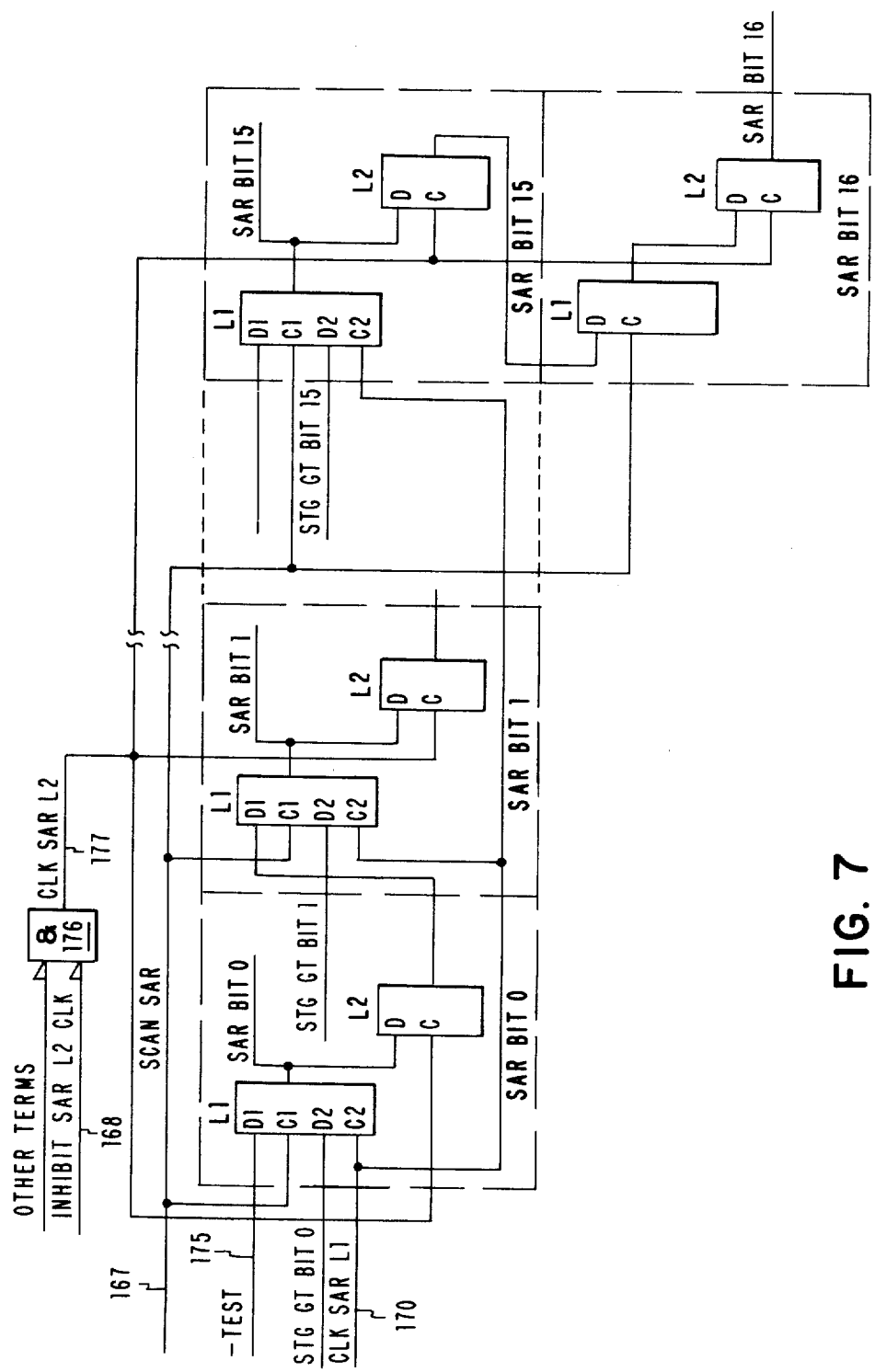
FIG. 7 is a schematic diagram illustrating the arrangement of the shiftable storage address register and the storage element for receiving the low order bit position from the storage address register after it has been shifted.

Storage 10 is addressed in a manner similar to that described in the aforementioned U.S. Pat. No. 3,972,023. The storage address comes from the storage address register (SAR) 16 which according to the present invention is a shiftable storage address register. Storage address register (SAR) 16 is shown in detail in FIG. 7. Each bit position of SAR 16 includes two latches which are connected in a manner described in U.S. Pat. No. 3,806,891 dated Apr. 23, 1974 by Eichelberger, et al. for Logic Circuit For Scan In/Scan Out and in U.S. Pat. No. 4,023,142 dated May 10, 1977 by Robert Woessner for Common Diagnostic Bus For Computer Systems To Enable Testing Concurrently With Normal System Operation. Each bit position consists of a L1 latch and a L2 latch which are interconnected with the output of the L1 latch connected to the data input of the L2 latch. The data bit output from SAR register 16 for each bit position can be taken from the L1 or L2 latch, and in this particular instance, for SAR bits 0-15 inclusive the outputs are taken from the L1 latch and for SAR bit 16 the output is taken from the L2 latch. The timing requirements for SAR bit 16 are slightly different from the timing requirements for the other SAR bits 0-15 inclusive, and thus the output for SAR bit 16 is taken from its L2 latch.

When SAR 16 is operated in a shift register mode for byte operations, a SCAN SAR signal on line 167 is applied to the C1 clock inputs of the L1 latches to clock data applied to the D1 data inputs of the L1 latches. The D1 data input of the L1 latch for bit zero can receive either a 0 or 1 bit for the shift operation on line 175, in this particular instance, dependent upon whether or not the first or second 32K words of storage 10 are being addressed in byte mode.

SAR register 16 is not shifted when operating in word mode. The L1 latches for bits 0-15 inclusive also include a D2 data input and a C2 clock input. The D2 data input is connected to the outputs of storage gates 100 and 101 to be described later herein. The C2 clock input is connected to receive a Clock SAR L1 clock signal on line 170. The L2 latches have a single data input connected to the output of the associated L1 latch and a clock input connected to receive a Clock SAR L2 signal on line 177 which transfers the data from the associated L1 latch into the L2 latch. From the foregoing, it is seen that SAR 16 can be operated in a shift register or non-shift register mode.

SAR 16 can be considered to contain a byte address when operating in byte mode and a word address when operating in word mode. A byte address after the shift produces a word address. This word address addresses the word containing the byte location corresponding to the byte address. For example, a byte address of 3 produces a word address of 1 after the shift. Word address 1 addresses a word containing bytes 2 and 3. Hence with a byte address of 3 before the shift, SAR bit 16 is set to a 1 after the shift to select the low byte of word 1 which, in this instance, is byte 3 which corresponds to the byte address of 3.

Figure 2:
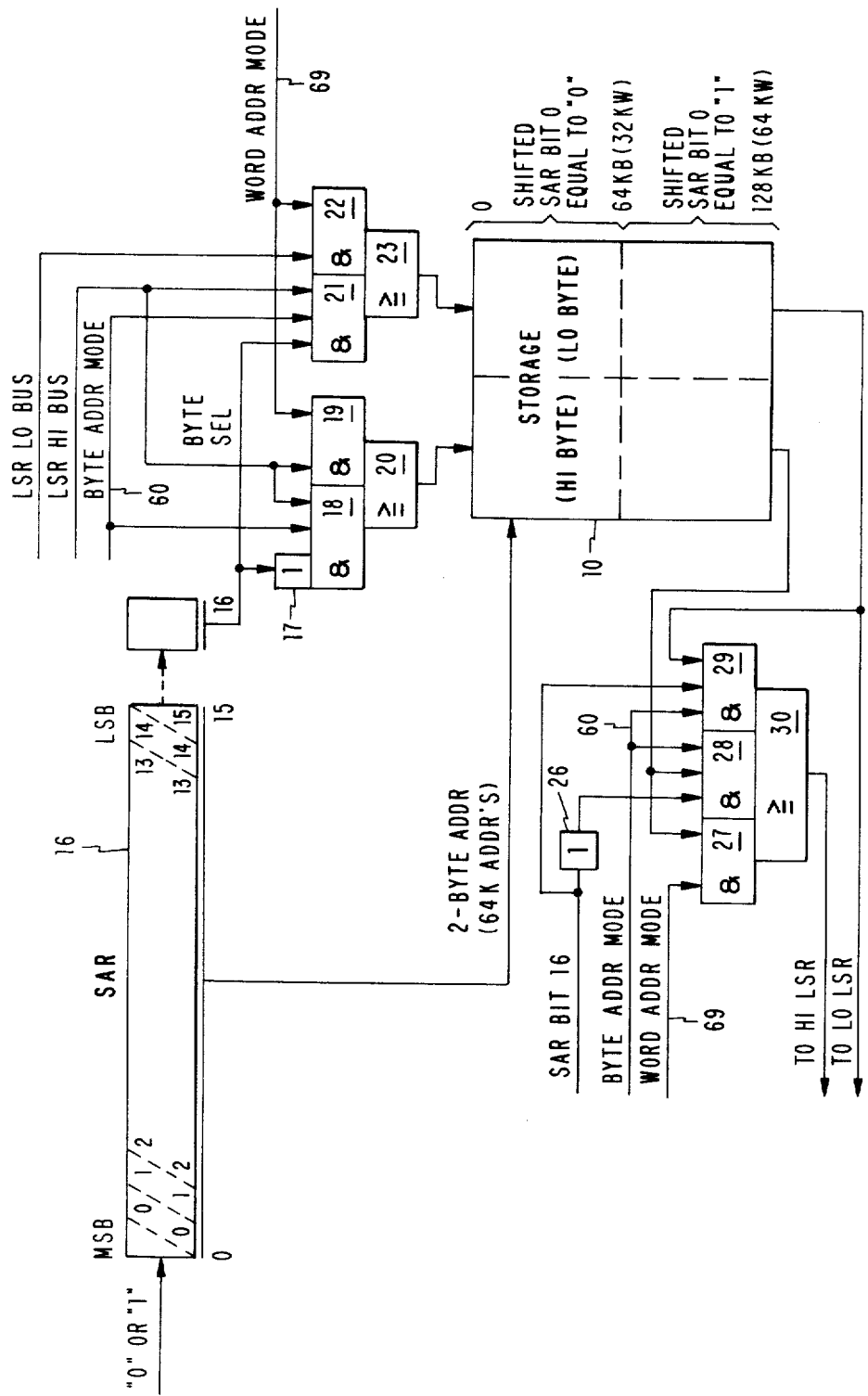
FIG. 2 is a schematic diagram illustrating the byte address mode of the present invention.

The byte mode operation is schematically illustrated in FIG. 2 where it is seen that the 16-bit address, bits 0-15 inclusive in SAR 16, are presented to storage 10 as a two-byte address. The addressing takes place after the shift and bit position 16 acquires the state of bit position 15 that it had prior to the shift. The output of SAR bit 16 is supplied directly to AND circuits 21 and 29 and to AND circuits 18 and 28 via inverters 17 and 26 respectively. AND circuits 18, 21, 28 and 29 are conditioned by a byte address mode signal. For a byte storage write operation, the byte to be written into storage is placed on LSR HI BUS and thus is applied to AND circuits 18 and 21. It should be recognized that AND circuits 18 and 21 are representative of a plurality of AND circuits, there being a separate AND circuit for each bit of the bus. AND circuit 18 is conditioned via inverter 17 to pass the byte into storage via OR circuit 20 if the state of SAR bit 16 is zero. Otherwise, AND circuit 21 is conditioned by the one state of SAR bit 16 and the byte passes into storage via OR circuit 23. For purposes of analogy the combination of inverter 17, AND circuits 18 and 19 and OR circuit 20 form storage gate HI 101 of FIG. 1 and the combination of AND circuits 21 and 22 and OR circuit 23 form storage gate LO 100. In actuality storage gate LO 100 and storage gate HI 101 are logically more complex because they are used for other purposes also and have more selection signals and inputs as shown in FIG. 1.

When a byte storage read operation is performed, the byte read from storage is transferred to the HI LSR. If the low byte of the addressed word read from storage is the byte being addressed, it is passed by AND circuit 29 via OR circuit 30 to the HI LSR. If the high byte is being addressed, AND circuit 28 will be conditioned via inverter 26 and will pass the high byte to the HI LSR via OR circuit 30. The combination of AND circuits 27, 28 and 29 and OR circuit 30 is representative only because data read from storage 10 first flows into storage data register 25 and from there via storage gates 100 and 101 to ALU gates 191 and 192 as in FIG. 1.

It will be seen later herein that during byte operations, the address in SAR 16 is incremented before the shift takes place. Additionally, during the shift of SAR 16, the high order bit thereof can be set to either zero or one to address the first or second block of 32K words, respectively.

Figure 3:
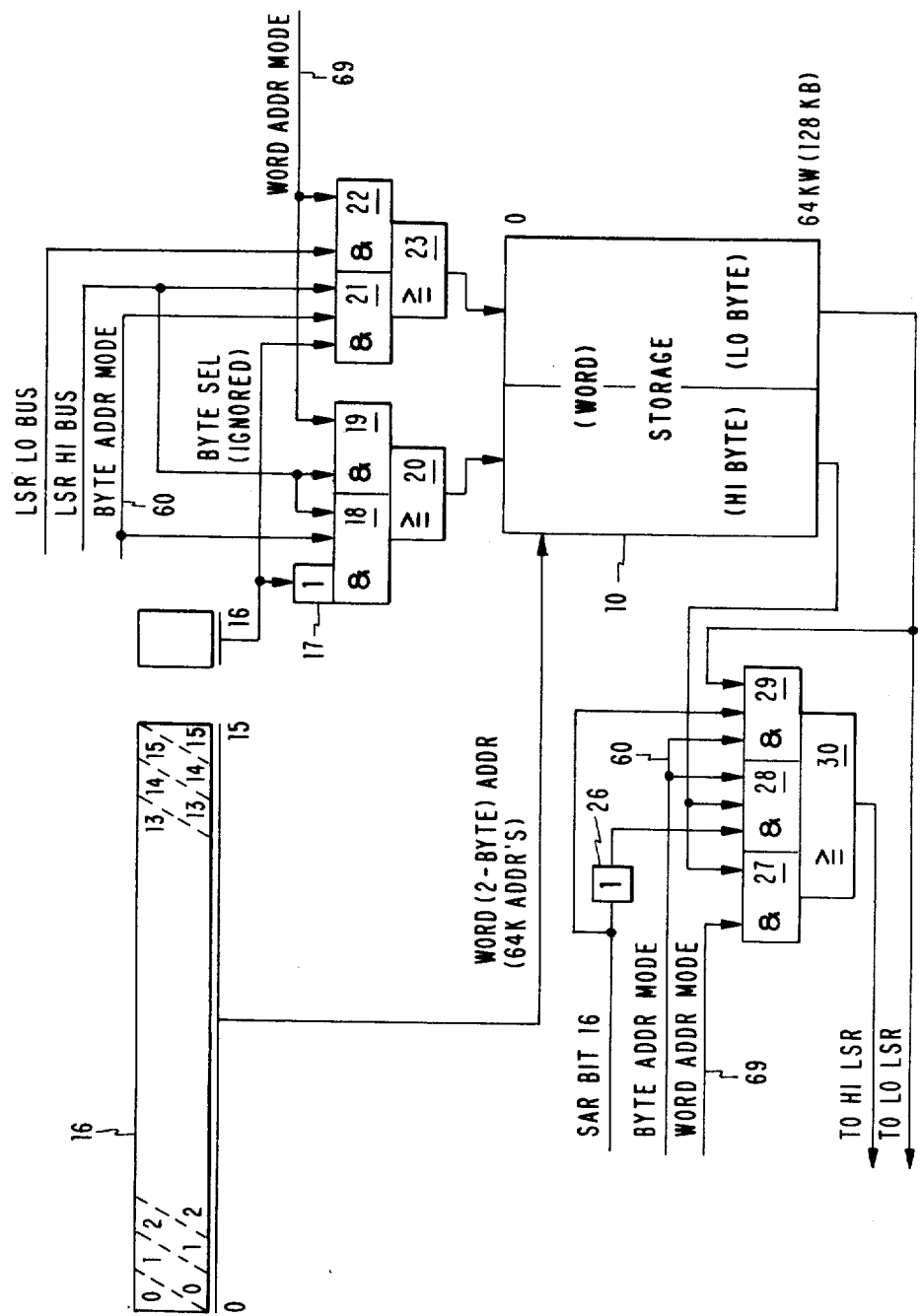
FIG. 3 is a schematic diagram illustrating the word address mode of the present invention.

The word address mode operation is illustrated in FIG. 3 where the contents of SAR 16 are, as in FIG. 2, again applied as a two-byte address to storage 10 and, of course, SAR 16 is not shifted for the word address mode. The state of bit position 16 of SAR 16 is immaterial because the byte address mode signal on line 60 is not present to condition AND circuits 18, 21, 28 and 29. The word address mode signal is present, however, on line 69 and it conditions AND circuits 19 and 22 for a word storage write operation and conditions AND circuit 27 for a storage read operation. The gating for the low byte read from storage is not shown in FIGS. 2 and 3 but is shown in FIG. 1.

Byte and word mode storage operations are initiated by a storage instruction which has a format as follows:

| STORAGE INSTRUCTION | | | | |
|---|---|---|---|---|
| OP Code 0 1 0 0 | HI | REG 1 | W C D V | REG 2 |
| 0    3 | 4 | 5    7 | 8    12 | 13    15 |

| | |
|---|---|
| Bits 0–3 | OP code identifies a storage instruction |
| Bit 4 (HI) | |
| HI = 0 | Designates read/write word (two byte) storage instruction. |
| HI = 1 | Designates read/write single byte storage instruction. |
| Bits 5–7 | |
| REG1 | LSR into/from data is transferred. |
| Bit 8 | OP code modifier |
| 8 = 0 | Designates and I/O storage instruction |
| 8 = 1 | Designates a storage instruction |
| Bit 9 (W) | Designates direction of data transfer |
| W = 0 | is a read from storage into a LSR register, |
| W = 1 | is a write to storage from a LSR register. |
| Bit 10 (C) | Storage selection, |
| C = 0 | indicative of main storage |
| C = 1 | indicative of control storage. |
| Bits 11–12 (DV) | Encoded where |
| | 00 = do not change address specified by Reg 2 |
| | 01 = increment address specified by Reg 2. |
| | 11 = decrement address specified by Reg 2. |
| Bits 13–15 | |
| REG2 | Designates LSR containing the storage address used for the data transfer |

Figure 5A:
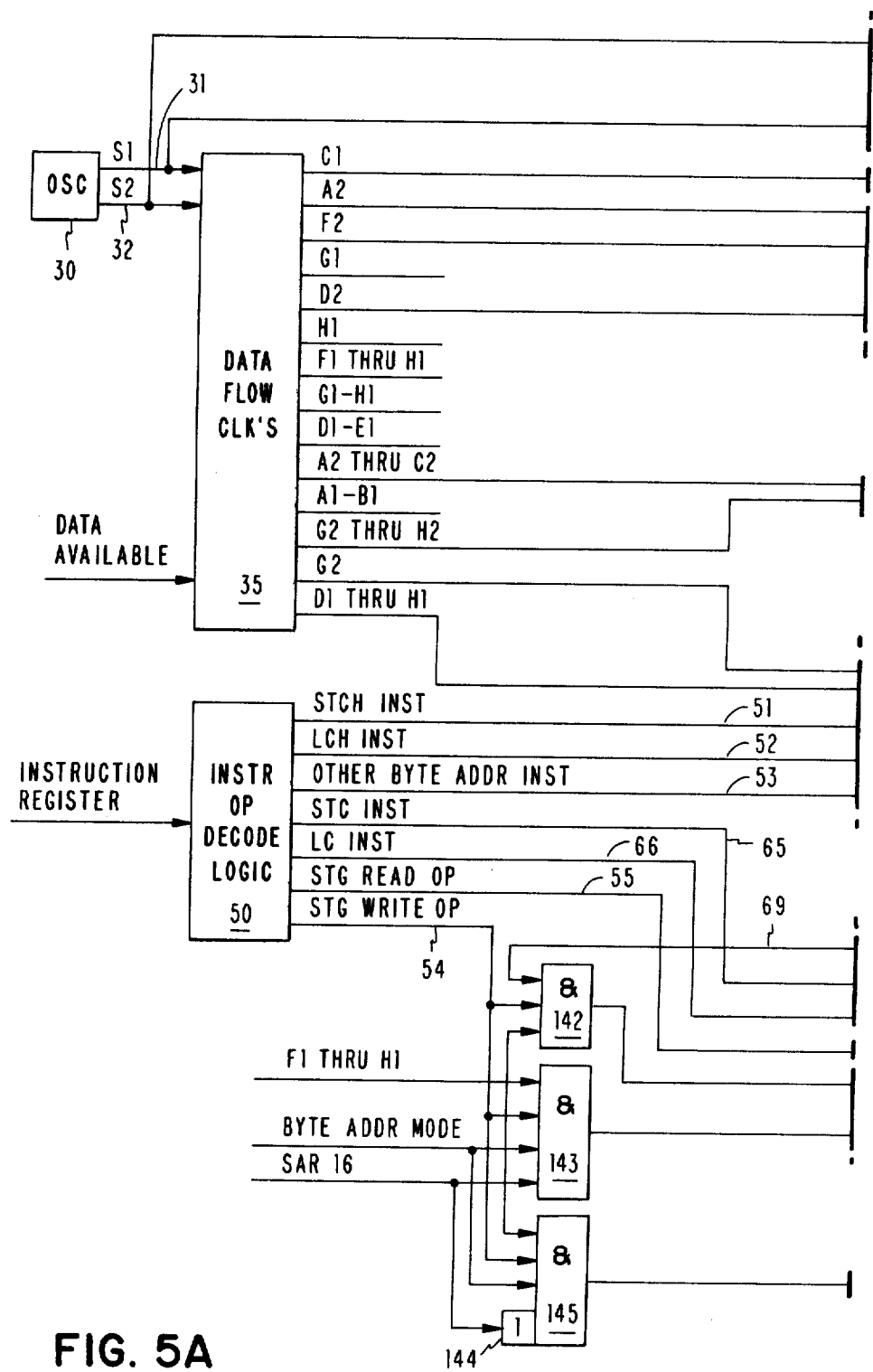
FIGS. 5A and 5B taken together with FIG. 5A disposed to the left of FIG. 5B are a schematic logic diagram illustrating clock generating circuitry for facilitating word and byte mode operation in the present invention.

The instructions or control words are fetched from storage 10, FIG. 1, by a word storage read operation after the system has been initialized in a well known manner such as power on reset or initial microprogram load. The instructions fetched from storage 10 are entered into an instruction register 40 and the instruction OPCODE represented by bits 0–3 and modified by bit 8 is decoded by Instruction OP Decode logic 50, FIG. 5A. With respect to a storage instruction, the Instruction Op Decode logic 50 interprets bit 4 of the instruction and generates a signal on line 51 for a byte storage write instruction or a signal on line 52 for a byte storage read instruction. A signal is generated on line 53 by Instruction Op Decode logic 50 for other byte address instructions. Signals on lines 54 and 55 indicate storage write and storage read operations respectively.

If bit 4 of the storage instruction is zero and bit 10(C) is one, this is indicative of a word storage read/write operation. A signal is generated by the Instruction OP Decode logic 50 on line 65 for a word storage write instruction and on line 66 for a word storage read instruction.

The timing for instruction fetching and execution originates from oscillator 30 which generates pulses S1 and S2 on lines 31 and 32 respectively. The pulses S1 and S2 are applied to data flow clocks represented by block 35 which includes conventional logic for generating clock signals. Instruction Register 40, FIG. 1, is clocked with a signal from AND circuit 136, FIG. 5B, which receives a S2 signal from oscillator 30 and a C1 clock signal from data flow clocks 35.

For byte operations, as previously mentioned, it is necessary to shift the storage address register (SAR) 16 and the shift signal Scan SAR comes from AND circuit 137 which receives a S1 clock signal from oscillator 30, a F2 clock signal from data flow clocks 35 and a byte address mode signal from OR circuit 59. The byte address mode signal is available from OR circuit 59 when either AND circuit 57 or 58 is active to pass a signal. AND circuit 57 is fed by OR circuit 56 and clock signals D1 through H1. OR circuit 56 receives signals from lines 51 and 52 indicative of either a byte storage write operation (STCH) or a byte storage read (LCH) operation. AND circuit 58 receives the signal on line 53 indicative of other byte address instructions and also receives other clock signals from data flow clocks 35 which are generated for those other byte address instructions. The SCAN SAR (SHIFT SAR L1) signal on line 167 is applied to the C1 clock inputs of the L1 latches of bit positions 0–15 in SAR 16 and to the C clock input of the L1 latch of SAR bit 16. The SCAN SAR (SHIFT SAR L1) signal for shifting SAR 16, as seen in the timing diagrams of FIGS. 8A, 8B and 9A, 9B, occurs after the address from SAR 16 has been updated. The update of the storage address takes place during F1 time and the shifting of SAR 16 occurs during F2 and G1 time. A byte of data is then read from or written into storage depending upon whether the instruction being executed is a byte storage read or write instruction. The storage card select line which is active as shown in FIGS. 8A, 8B and 9A, 9B determines the actual time as to when reading or writing of data takes place.

For word storage read and write operations, a Clock SAR L2 signal clocks the L2 latches of SAR 16. For byte operations, however, the Clock SAR L2 signal must be inhibited because the data inputs of the L1 latches must be steady during the shift of SAR 16 and this is accomplished by feeding the byte address mode signal into AND circuit 138 which also receives a F2 clock signal from data flow clocks 35. The output of AND circuit 138 is an Inhibit SAR L2 CLK signal and it is fed over line 168 to AND circuit 176, FIG. 7. AND circuit 176 also has an input for receiving other terms not pertinent to the present invention, but if either input to AND circuit 176 is active, its output, the Clock SAR L2 signal, is inactive.

The storage read and write operations require a Storage Access Request signal which eminates from OR circuit 139. OR circuit 139 receives A2 through C2 clock signals from data flow clocks 35, a signal for other terms or operations requiring a storage operation, and signals from AND circuits 61, 62, 75 and 76 respectively. AND circuit 61 is fed by line 51 and by G2 through H2 clock signals from data flow clocks 35. AND circuit 62 is fed by line 52 and by a G2 clock signal. The AND circuits 75 and 76 function in a manner similar to AND circuits 61 and 62 but are involved with word storage operations rather than byte storage operations. Thus AND circuit 75 has an input from line 65 to receive a signal indicating a word storage write operation and an input for receiving G2 through H2 clock signals. AND circuit 76 has an input connected to line 66 for receiving a word storage read signal and an input connected to receive a G2 clock signal.

The Storage Access Request signal on line 169 is thus active for both word and byte storage read and write operations and feeds the storage clocks and addressing gating block 150 which, in this particular example, also receives the output of SAR 16. The storage clocks 150 are also used during a storage refresh operation which is not pertinent to the present invention. Storage clocks and addressing gating block 150 provide a storage card select signal on line 151. This signal is used by the storage control logic during the storage read and write operations as seen in the timing diagrams of FIGS. 8A, 8B; 9A, 9B; 10A, 10B and 11A and 11B. The storage address bus 153 is also taken from block 150.

The L1 latches of SAR 16 must be clocked for both byte and word storage operations. The Clock SAR L1 signal comes from AND circuit 140 which receives a S1 pulse from oscillator 30 and a signal from OR circuit 70. OR circuit 70 receives an A2 clock signal from data flow clocks 35, a signal representing other terms for other operations not pertinent to the present invention, and signals from AND circuits 63 and 68. AND circuit 63 is fed by the output of OR circuit 56 and by a D2 clock signal from data flow clocks 35. AND circuit 68 also receives the D2 clock signal from data flow clocks 35 and a signal from OR circuit 67 which in turn receives signals on lines 65 and 66 from Instruction Op Decode logic 50 indicating word storage write and read operations respectively. The Clock SAR L1 signal on line 170, FIG. 5B, is applied to the C2 clock input of the L1 latches, FIG. 7, for bits 0–15 of SAR 16 whereby the data at the D2 data inputs of these L1 latches is set therein.

If the storage instruction specifies a word storage write operation, both the high and low bytes of storage are written; however, if the storage instruction specifies a byte storage write operation then depending upon which byte is involved, it is necessary to have either a write storage low signal WRITE STG LO or a write storage high signal WRITE STG HI. The write storage low signal WRITE STG LO comes from OR circuit 146 which is fed by AND circuits 142 and 143 and by logic for other terms not pertinent to the present invention. AND circuit 142 essentially generates the write storage low signal WRITE STG LO for word storage write operations and AND circuit 143 generates the write storage low signal WRITE STG LO for byte storage write operations. AND circuit 143 receives F1 through H1 clock signals from data flow clocks 35, a Storage Write Op signal from line 54 and a signal from OR circuit 67. AND circuit 143 receives the F1 through H1 clock signals from data flow clocks 35, the byte address mode signal from OR circuit 59, the Storage Write Op signal from line 54 and an input from SAR bit 16. It is thus seen that for a storage write operation, when operating in the word mode, AND circuit 142 will always generate a write storage low signal WRITE STG LO but AND circuit 143 will generate a write storage low signal WRITE STG LO only if SAR bit 16 is a one.

AND circuit 142 also feeds OR circuit 147 for generating the write storage high signal WRITE STG HI. It is thus seen that for storage write operations in word mode, the write storage low and write storage high signals will be active. OR circuit 147 also has an input from AND circuit 145 which has inputs similar to the inputs of AND circuit 143 except for SAR bit 16 input. The SAR bit 16 input is applied to AND circuit 145 via inverter 114. Thus, AND circuit 146 generates a write storage high signal WRITE STG HI when SAR bit 16 is a zero. OR circuit 147 also has an input representing other terms which are not pertinent to the present invention.

Figure 5B:
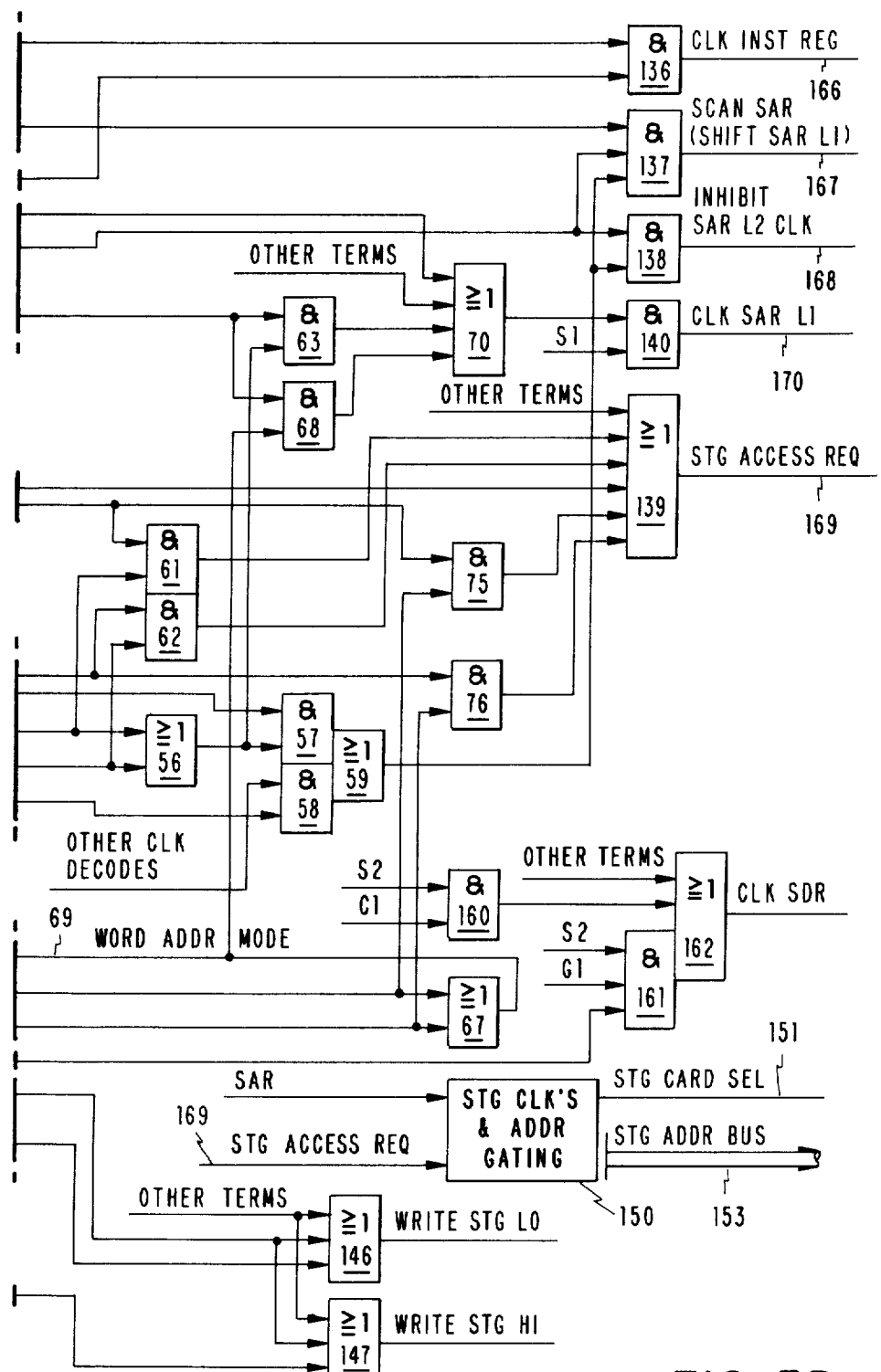

When storage 10 is accessed during a storage read operation, the data retrieved from storage is entered into the storage data register (SDR) 25, FIG. 1, which is clocked by a clock SDR signal coming from OR circuit 162, FIG. 5B. The storage data register 25 is always clocked at the same time that instruction register 40 is clocked. Thus, AND circuit 160 receives the S2 pulse from oscillator 30 and the C1 clock signal from data flow clocks 35 as does AND circuit 136 previously described. AND circuit 160 feeds OR circuit 162 together with other terms and the output of AND circuit 161. AND circuit 161 is fed by the Storage Read Op signal on line 55, a G1 clock signal from data flow clocks 35 and a S2 pulse from oscillator 30. Thus, the SDR 25 is clocked for all storage read operations whether byte mode or word mode operations.

Data entered into SDR 25 from storage 10, FIG. 1, is applied to storage gate low (STG GATE LO) 100 and to storage gate high (STG GATE HI) 101. Storage gate low 100, in addition to receiving an input from SDR 25 receives inputs from the high and low byte outputs of local storage registers (LSR) in stack 200 and an input from storage gate high 101. These inputs are selectable under control of select signals which will be described shortly with respect to both gates 100 and 101. Storage gate high 101 has an input from the high output of LSR stack 200, an input from System Bus In (SBI) which is essentially from the I/O channel, not shown, and an input from X register 185.

Figure 6A:
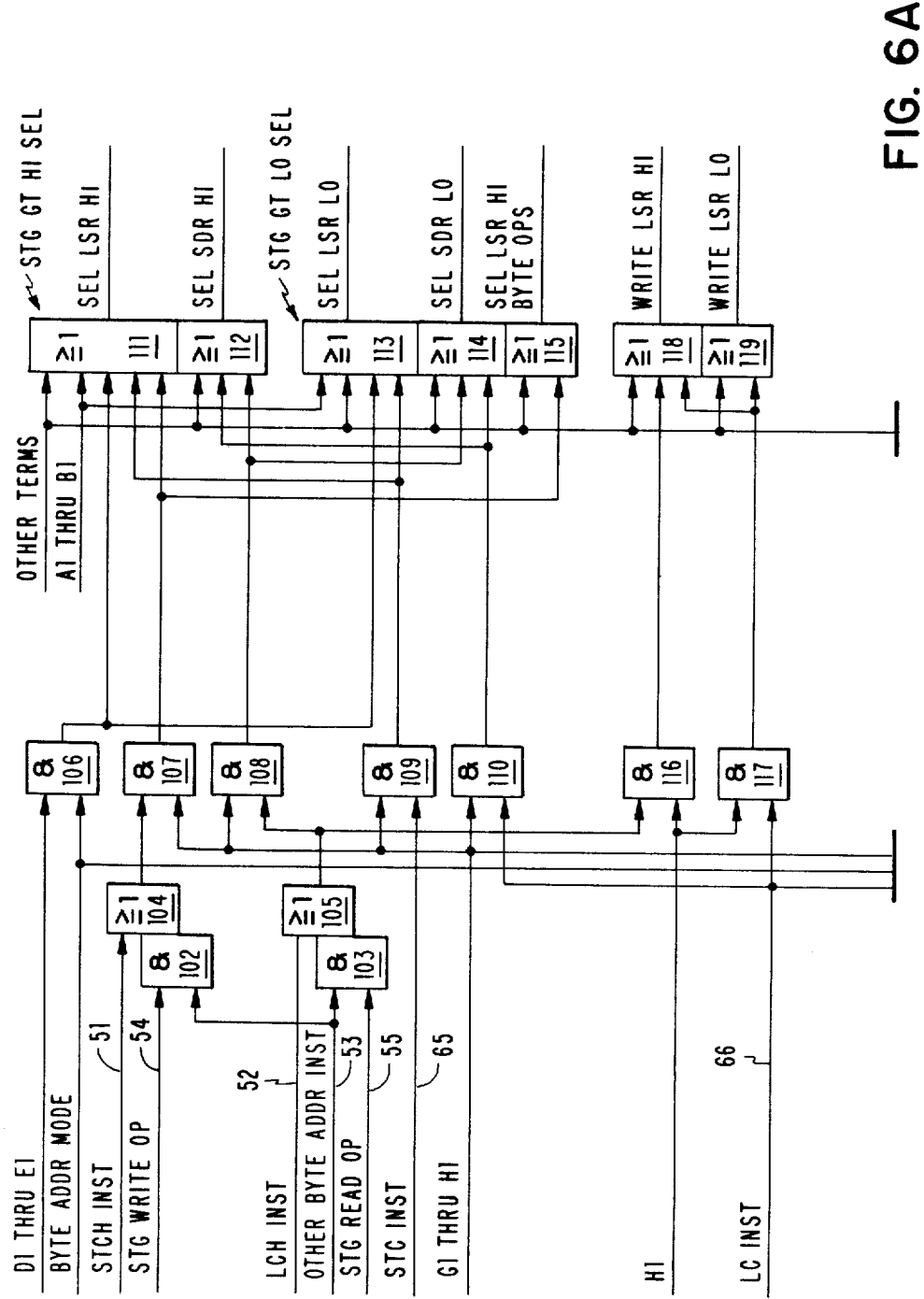
FIGS. 6A and 6B taken together with FIG. 6A disposed above FIG. 6B are a logic circuit diagram illustrating the logic for developing gate control and register write signals.

Storage gate low 100 uses select signals for selecting which input it will pass to its output. These select signals include Select LSR LO from OR circuit 113, FIG. 6A, Select SDR LO from OR circuit 114 and Select LSR HI Byte Ops from OR circuit 115. Or circuit 113 has an output for storage write operations in both byte and word modes. For byte mode operation, it receives an input from AND circuit 106 which has inputs for receiving the byte address mode signal and D1 through E1 clock signals from data flow clocks 35. For word storage read operations, OR circuit 113 receives a signal from AND circuit 109 which has an input from line 65, FIG. 5A, and an input for receiving the G1 through H1 clock signals from data flow clocks 35. OR circuit 113 also receives clock signals A1 through B1 from data flow clocks 35 and receives other terms not pertinent to the present invention.

OR circuit 114 for passing a Select SDR LO signal has an input for receiving other terms not pertinent to the present invention, an input from AND circuit 108 and an input from AND circuit 110. AND circuit 108 has an input connected to the output of OR circuit 105 and an input for receiving G1 through H1 clock signals. OR circuit 105 receives the signal for a byte storage read operation on line 52 and receives the output of AND circuit 103. AND circuit 103 has an input for receiving the STG READ OP signal on line 55 and an input for receiving Other Byte Address Instructions on line 53. AND circuit 110 is connected to receive the G1 through H1 clock signals from data flow clocks 35 and the word storage read instruction LC INST on line 66. Additionally, OR circuit 114, like OR circuit 113, has another terms input which is not pertinent to the present invention.

In FIG. 1 it is seen that both the high and low outputs of LSR stack 200 are applied to storage gate low 100. Hence, OR circuit 115 provides the Select LSR HI BYTE Ops signal to facilitate the writing the high byte from LSR stack 200 into the low byte of the word being addressed during the storage write operation. Thus, during a storage byte write operation the high byte from LSR stack 200 can be written into either the high or low byte of a storage word. In this particular embodiments of the present invention, the byte operations always use the high LSR's. Obviously, the embodiment of the present invention could be changed whereby the low LSR's or other registers are used for byte operations without affecting the scope of the invention.

The REG 1 field of a storage instruction designates the LSR into which data is to be entered. For this purpose, the output of storage gate low 100 is directly applied to ALU gate low 191 and the output of storage gate high 101 is applied directly to ALU gate high 192. ALU gates 191 and 192 also have inputs from ALU 190. ALU 190 in this particular example is used, in addition to its normal functions, to update the instruction address and the storage address. The updating takes place in response to ALU control signals, not shown, which result from the decoding of instructions and in this instance, a storage instruction. As seen in the timing diagrams of FIGS. 8A, 8B; 9A, 9B; 10A, 10B and 11A, 11B, the instruction address is updated during C1 time and the storage address is updated during F1 time. The instruction address in SAR 16 is also set into X register 185 at the same time. Thus, during an instruction address update, the contents of the X register 185 are passed to ALU 190, incremented and transferred vai ALU gates low and high 191 and 192 respectively into an instruction address register (MAR) of LSR's 200.

The storage address is updated by passing the contents of the LSR designated REG 2 in the storage instruction to the ALU 190 via storage gates low and high 100 and 101 respectively and X register 185. Updating takes place according to the decode of bits 11–12 of the storage instruction. The updated address is then returned to LSR REG 2.

Figure 6B:
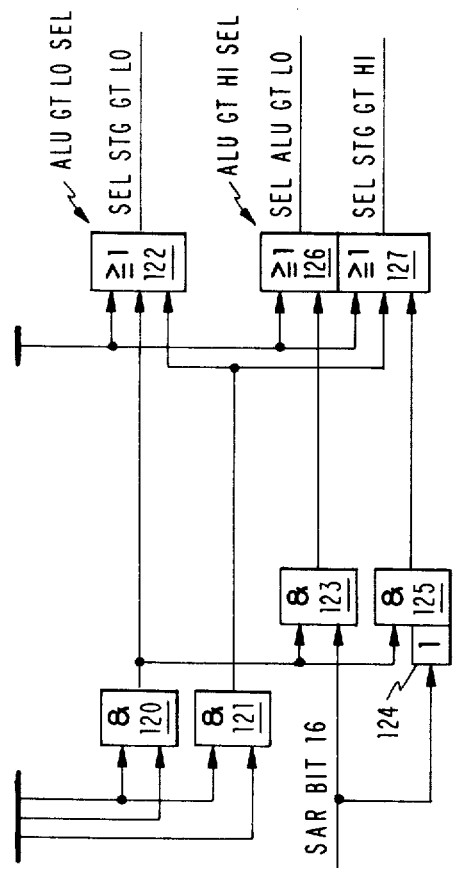

Additionally ALU gate low 191 has an input from Y register 180 and ALU gate high 192 has an input from ALU gate low. Only the gate selection signals pertinent to the present invention are shown. Thus, ALU gate low 191 is connected to receive the Select Storage Gate LO signal from OR circuit 122, FIG. 6B. In the absence of any ALU gate select signals, the input from ALU 190 is selected. OR circuit 122 has inputs from AND circuits 120 and 121 as well as an input for receiving other terms. AND Circuit 120 receives the byte address mode signal and a G1 through H1 clock signal from data flow clocks 35. AND circuit 121 also receives the G1 through H1 clock signals from data flow clocks 35 and a signal from line 66 indicating a word storage read operation.

The byte of data passed by ALU gate low 191 is written into the low byte of the selected LSR register in LSR stack 200 under control of a Write LSR LO signal from OR circuit 119. OR circuit 119 has an input for receiving other terms not pertinent to the present invention and an input from AND circuit 117. AND circuit 117 has an input for receiving the H1 clock signal from data flow clocks 35 and an input for receiving the signals on line 66 indicating a word storage read operation.

ALU gate high 192 passes the output of ALU gate low 191 and OR circuit 126 provides a Select ALU gate LO signal. OR circuit 126 has an input connected to receive the output of AND circuit 123 and an input for receiving other terms not pertinent to the present invention. AND circuit 123 is connected to the output of AND circuit 120 and to SAR bit 16. Thus, if SAR bit 16 is a one, ALU gate high 192 selects the output of ALU gate low 191 and writes the data into the high byte of LSR stack 200 under control of a Write LSR HI signal from OR circuit 118. OR circuit 118 has an input connected to the output of AND circuit 116, an input from AND circuit 117 and an input for receiving other terms not pertinent to the present invention. AND circuit 116 has an input connected to the output of OR circuit 105 and an input connected to receive the H1 signal from data flow clocks 35.

ALU gate high 192 can also pass the input from storage gate high 101 when there is a Select Storage Gate HI signal from OR circuit 127. OR circuit 127 has inputs connected to outputs of AND circuits 121 and 125 respectively and an input connected to receive other terms not pertinent to the present invention. AND circuit 121 has an input connected to line 66 and an input connected to receive the G1 through H1 clock signals from data flow clocks 35. Thus, AND circuit 121 passes a signal to OR circuit 127 for developing a Select Storage Gate HI signal during word storage read operations.

AND circuit 125 functions to pass a signal to OR circuit 127 for byte storage read operations and has an input connected to the output of AND circuit 120 and an input connected to the output of inverter 124. Inverter 124 is connected to SAR bit 16. Hence, when SAR bit 16 is zero, the byte passed by storage gate high 101 will be passed by ALU gate high 192 and written into the high byte of the LSR register selected in the LSR stack 200.

Figure 8A:
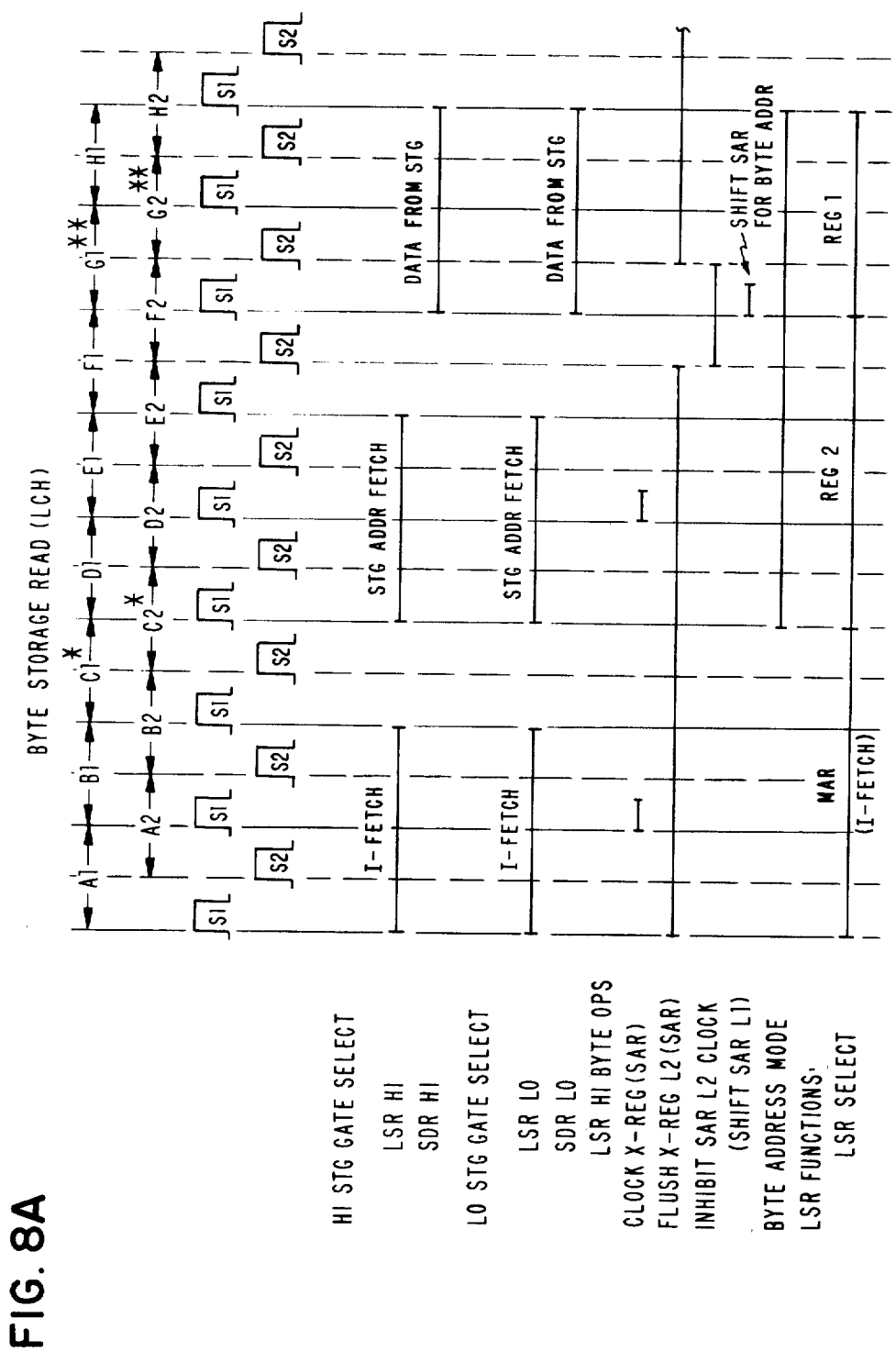
FIGS. 8A and 8B taken together with FIG. 8A disposed above FIG. 8B are a timing diagram illustrating a storage read operation in byte mode.
Figure 8B:
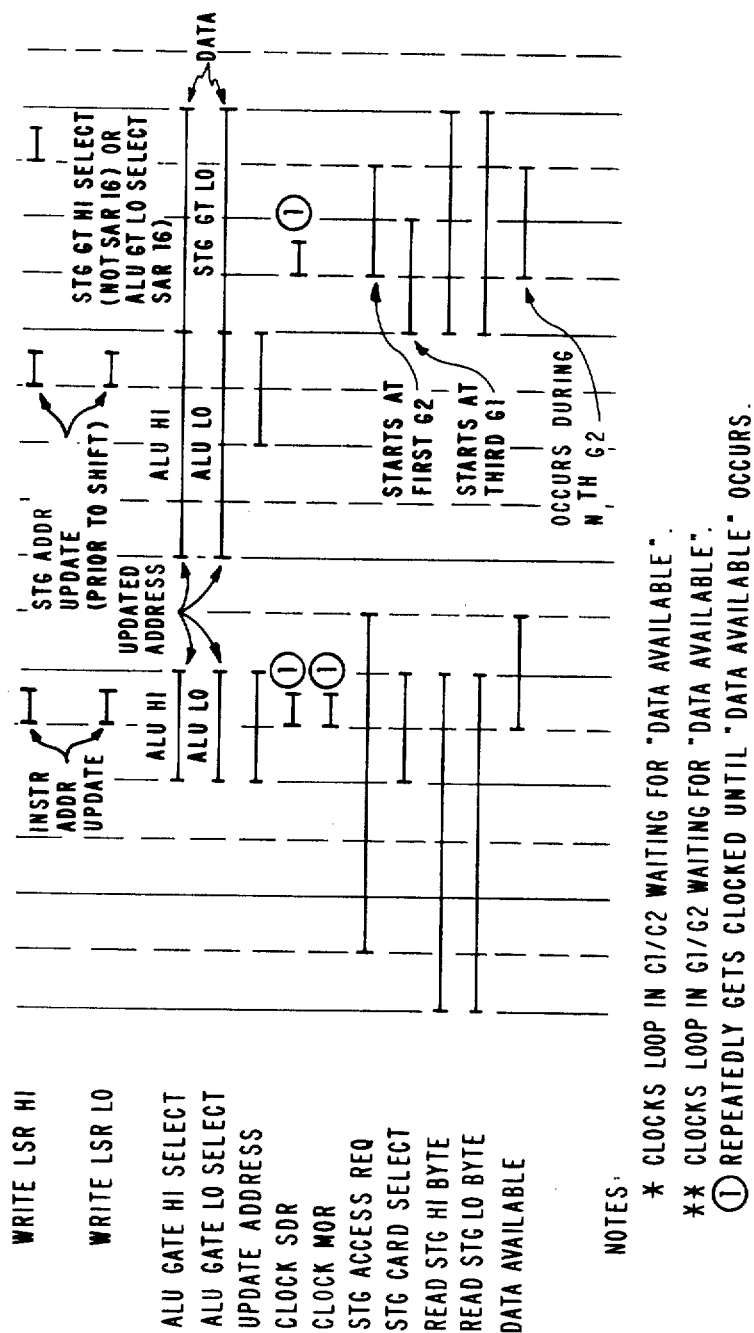
Figure 9A:
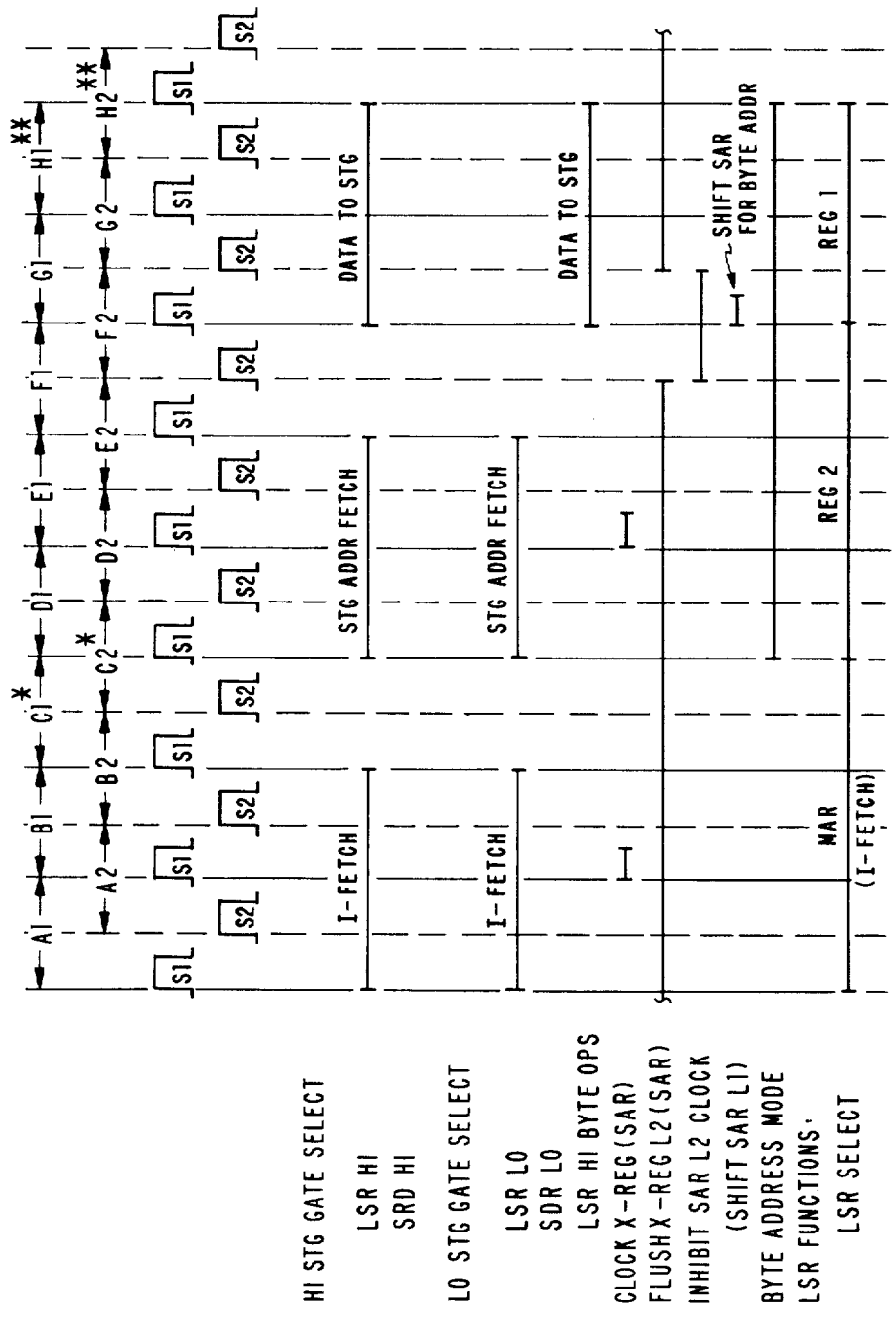
FIGS. 9A and 9B taken together with FIG. 9A disposed above FIG. 9B are a timing diagram illustrating a storage write operation in byte mode.
Figure 9B:
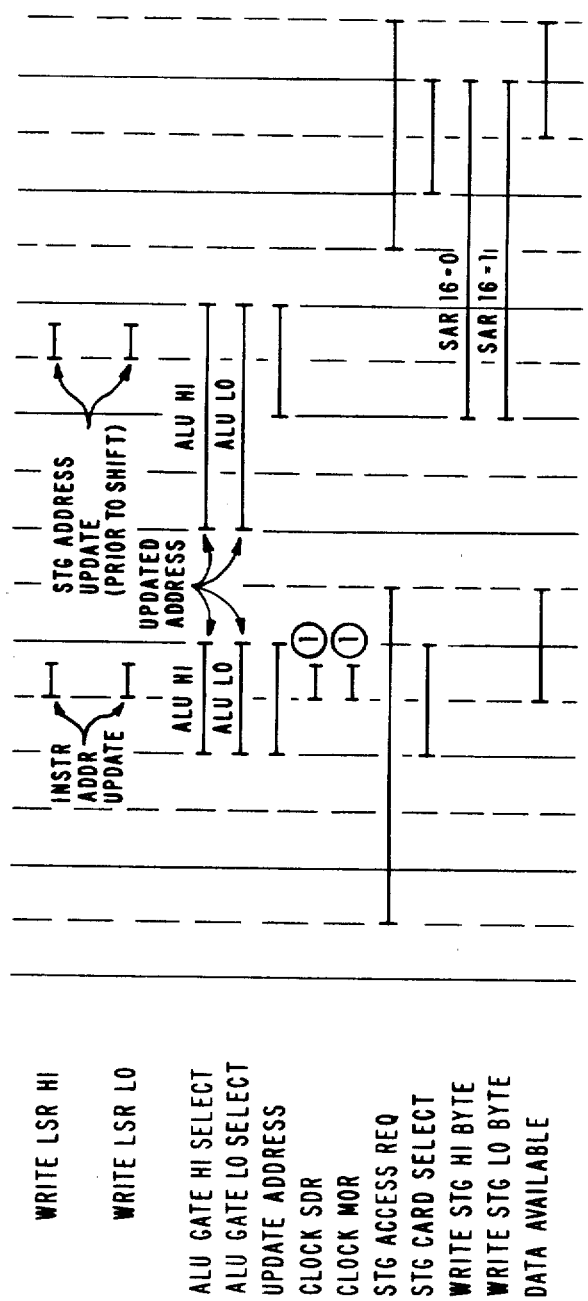
Figure 10A:
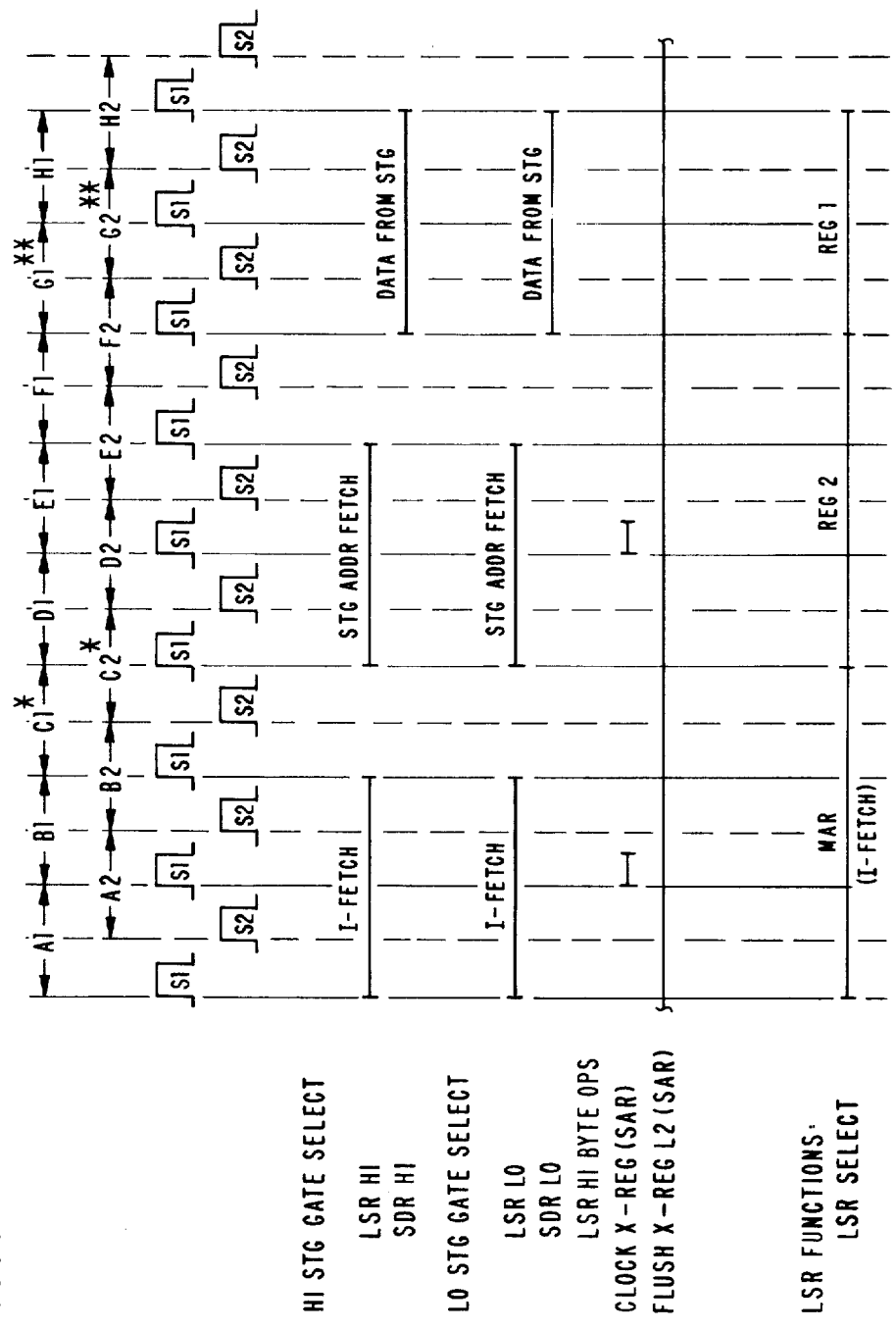
FIGS. 10A and 10B taken together with 10A disposed above FIG. 10B are a timing diagram illustrating a storage read operation in word mode; and, FIGS. 11A and 11B taken together with FIG. 11A disposed above FIG. 11B are a timing diagram illustrating a storage write operation in word mode.
Figure 10B:
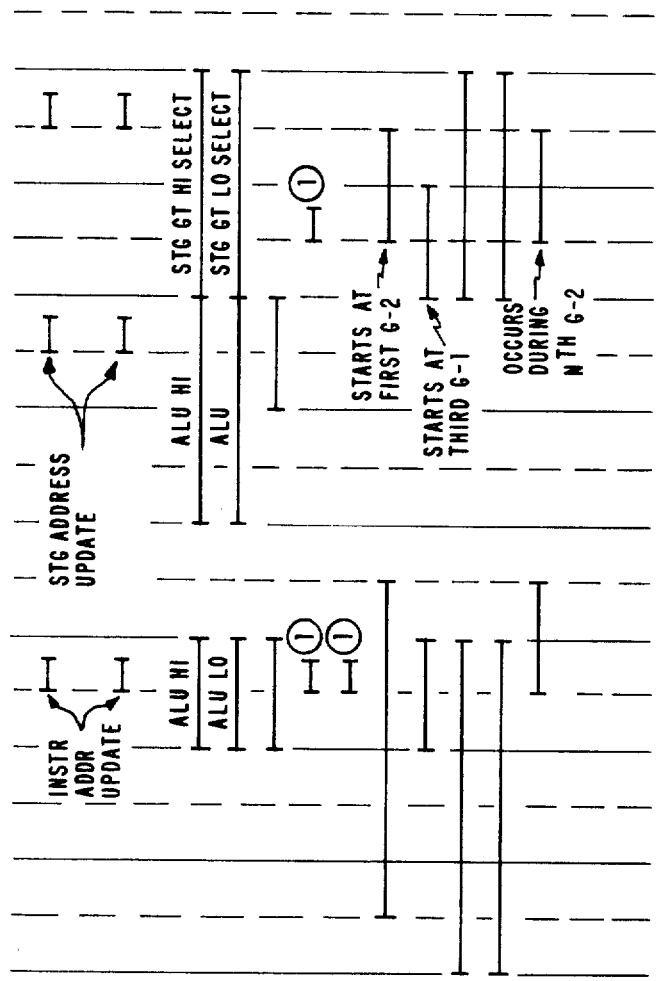
Figure 11A:
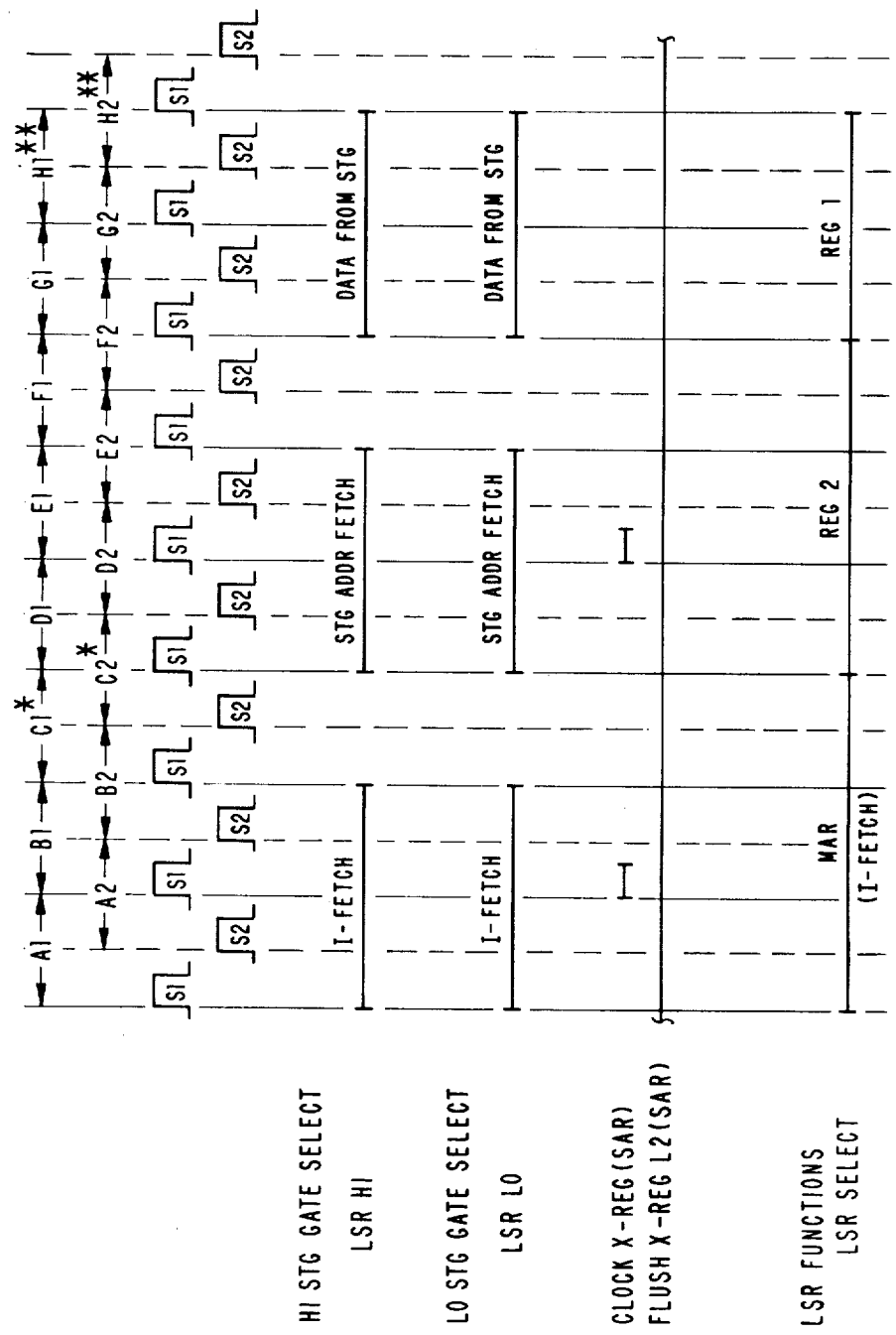
Figure 11B:
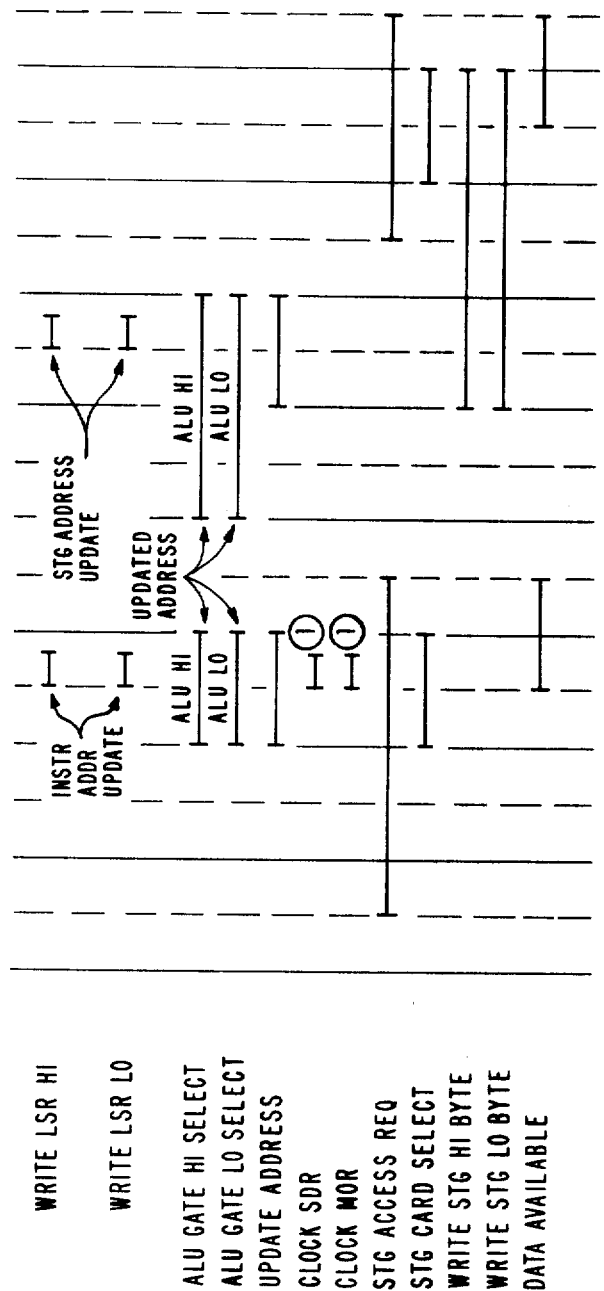

FIGS. 8A and 8B taken together are a timing diagram for illustrating the timing for a byte storage read instruction LCH. This timing diagram illustrates the shift for the storage address register 16 whereas the timing diagram for a word storage read instruction LC, FIGS. 10A and 10B, does not include the shift or the byte address mode signal. The timing diagram of FIGS. 9A and 9B illustrates the timing for a byte storage write instruction STCH which shows the shift timing for the storage address register 16 and the byte address mode signal which are absent from the timing diagram of FIGS. 11A and 11B which illustrates a word storage write instruction STC. Additionally, the gate selection timing for the storage gates 100 and 101, the timing for the ALU gates 191 and 192, the timing for writing the LSR's 200, the timing for clocking the instruction register 40, the SDR 25, the X register 185 and SAR 16 and the storage card select timing are shown in FIGS. 8A, 8B; 9A, 9B; 10A, 10B and 11A and 11B.

Figure 4:
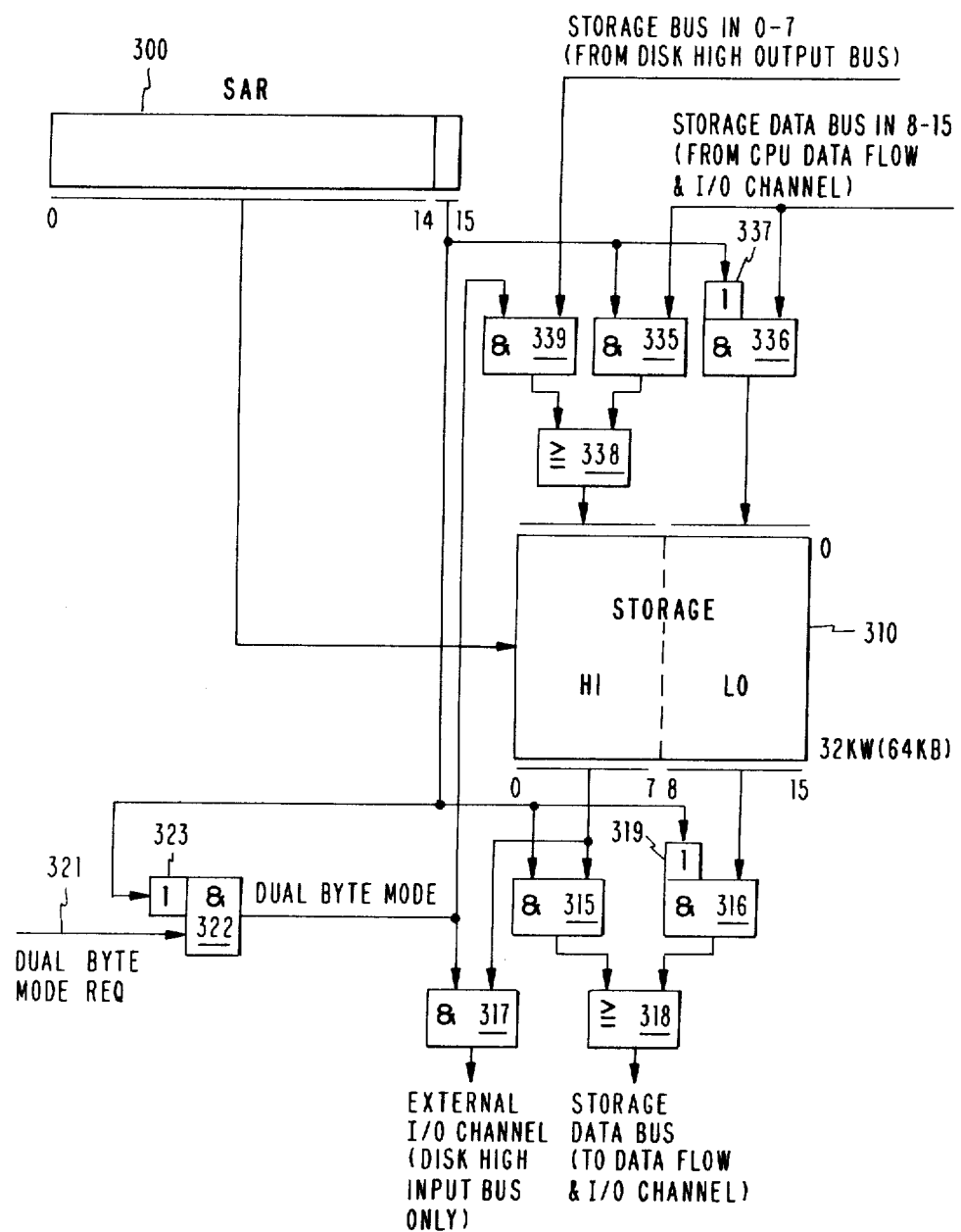
FIG. 4 is a schematic diagram illustrating a prior art arrangement using byte addressing for one and two-byte operations.

FIG. 4 illustrates a prior art arrangement for one byte and two byte operations but where storage is organized on a byte basis and the low order bit position in the storage address register is used for byte selection. Bits 0–14 inclusive of the storage address register 300 present a 15-bit address, rather than a 16-bit address as in the present invention, to storage 310. If the operation is a storage read operation, two bytes flows from storage 310 and are applied to AND circuits 315 and 316 respectively. The byte applied to AND circuit 315 is also applied to AND circuit 317. AND circuits 315 and 316 connect to OR circuit 318 which has its output connected to the storage data bus which leads to the data flow within the central processing unit and to the I/O channel. The output of AND circuit 317 is connected only to the external I/O channel. Two-byte operations are limited to the channel. AND circuits 315 and 316 are conditioned by the state of bit 15 of SAR 300. Bit 15 of SAR 300 is directly applied to AND circuit 315 and to AND circuit 316 via inverter 319. By this arrangement if bit 15 is a one, AND circuit 315 is conditioned to pass the high byte to the storage data bus via OR circuit 318. On the other hand, if bit 15 is a zero, AND circuit 316 is conditioned via inverter 319 to pass a low byte from storage via OR circuit 318 to the storage data bus.

AND circuit 317 is conditioned only during a two or dual byte mode operation. When a dual byte mode operation is required, the I/O device requiring the operation activates a dual byte mode request signal on line 321 which is connected to an input of AND circuit 322. AND circuit 322 is conditioned by SAR bit 15 via inverter 323. Hence, in order for AND circuit 322 to be conditioned, SAR bit 15 must be zero. This requirement ensures that the dual byte mode operation takes place on a word or two-byte boundary. Also, this requirement carries over into address incrementing because now for a dual byte mode operation addressing incrementing must be by two rather than by one for a single byte mode operation. In the present invention, address updating is the same for byte operations as it is for word operations.

The logic for the storage write operation is similar to the logic for the storage read operation. The storage data bus in from the central processing unit data flow and I/O channel is connected to AND circuits 335 and 336. AND circuit 335 is conditioned by the state of SAR bit 15 directly and AND circuit 336 is conditioned by the state of SAR bit 15 via inverter 337. Thus the byte presented in single-byte mode can be written into the high or low byte of storage 310 depending upon the state of SAR bit 15. For dual byte mode operation, the storage bus in for bits 0-7 inclusive is connected to an input of AND circuit 339 which is conditioned by the output of AND circuit 322. Thus the same constraints that exist for a storage read operation in dual byte mode also exist for a storage write operation.

From the foregoing, it is seen that the present invention with minimal additional logic provides single byte and two-byte addressing of a storage organized on a two-byte or word basis. It is further seen that the addressing range has not been reduced as in the prior art because all bits of the storage address register are presented as an address to storage. In the prior art the low order address bit is not used as part of the address presented to storage but is used for byte selection. It is further seen in the present invention that the incrementing of the storage address is uniform for both single byte and dual byte addressing modes.

Having thus described the invention, what is claimed as new, and desired secured by Letters Patent is:

1. Apparatus for controlling byte and word addressing of storage organized by words where each word consist of two bytes, the improvement comprising:
   a shiftable storage address register connected to address said storage,
   logic means for providing a shift signal for byte storage addressing and a word address signal for word storage addressing,
   storage access means responsive to said shift and word address signals for generating storage access signals,
   means for selectively applying said storage access signals to said storage, and
   means for selectively applying said shift signal to said address register whereby a shifted storage address is applied to storage for byte storage addressing and in the absence of said shift signal being applied to said address register a non-shifted storage address is applied to storage for word storage addressing.

2. Apparatus for controlling byte and word addressing of storage organized by words, where each word consists of two bytes, during storage read and write operations, the improvement comprising:
   a shiftable storage address register connected to address said storage on a word basis,
   address loading means for loading said shiftable storage address register with a byte or word address where said byte or word addresses each comprise a plurality of bits,
   mode control logic means for generating signals indicating byte and word address modes,
   shift means for shifting said storage address register in response to receiving a byte address mode signal whereby a bit is shifted from said storage address register,
   bit storage means connected to said shiftable storage address register for storing a bit shifted from said storage address register, and
   selection means operable during storage read and write operations in response to a byte address mode signal for selecting the byte of a word being read from storage and for designating the byte location of the word being addressed for writing a byte into storage using the bit stored by said bit storage means for making the selection and operable in response to a word address mode signal for passing a word read from storage and for passing a word to the word location being addressed for writing a word into storage.

3. Apparatus for controlling byte addressing of storage during storage read and storage write operations where said storage is organized by words and each word consists of two bytes, the improvement comprising:
   a shiftable storage address register connected to address said storage on a word basis and a non-shifted address for word operations,
   means for loading said shiftable storage address register with a byte address consisting of a plurality of bits,
   indicating means for indicating byte operations,
   shift means responsive to said indicating means indicating a byte operation for shifting said shiftable storage address register whereby a bit is shifted from said storage address register,
   bit storage means connected to said shiftable storage address register for storing a bit shifted from said storage shiftable address register,
   means for applying the storage address in said storage address register at a predetermined time to said storage, and
   byte selection means operable during storage read and write operations when said indicating means indicates a byte operation for selecting the byte of a word being read from or written into storage during said read and write operations using the bit stored by said bit storage means for making the selection.

4. The apparatus of claim 2 further comprising storage address updating means for updating the storage address from said storage address register,
register means for storing said updated storage address, and
means for transferring the updated storage address at a predetermined time from said register means into said storage address register whereby a new storage address becomes available to address storage.

5. The apparatus of claim 4 wherein said storage address updating means for byte addressing updates the storage address from said storage address register prior to said shift means shifting said storage address register.

6. The apparatus of claim 4 wherein said storage address updating means for word addressing updates the storage address from said storage address register simultaneously with application of said storage address to storage.

7. Apparatus for controlling byte and word addressing of storage during storage read and storage write operations where said storage is organized by words and each word consists of two bytes, one byte being a high byte, the other byte being a low byte, said storage having high byte and low byte inputs and outputs, the improvement comprising:
a shiftable storage address register connected to address storage on a word basis,
means for loading said shiftable storage address register with a byte or word address each comprising a plurality of bits,
byte indicating means for indicating byte operations,
word indicating means for indicating word operations,
shift means responsive to said byte indicating means indicating a byte operation for shifting said shiftable storage address register whereby a bit of said byte address is shifted from said storage address register,
bit storage means connected to said storage address register for storing said bit shifted from said shiftable storage address register during byte operations,
high and low byte input storage gates connected to said high byte and low byte inputs of said storage,
high byte and low byte storage output gates connected to said high byte and low byte storage outputs, said high byte storage output gate also being connected to said low byte storage output,
means for connecting said byte indicating means to said high byte input and low byte input storage gates and to said high byte storage output gate,
means for connecting said bit storage means to said storage high byte input and low byte input storage gates and to said storage high byte output gate, said high byte input and low byte input storage gates being operable under control of said byte indicating means and said bit storage means for passing either a high byte or a low byte into a word of
storage addressed by said storage address register and said storage high byte output gate being operable under control of said byte indicating means and said bit storage means for passing either a high byte or a low byte from a word of storage addressed by said storage address register,
means for connecting said word indicating means to said high byte input and low byte input storage gates and to said high byte and low byte storage output gates, said high byte input and low byte input storage gates being operable under control of said word indicating means for passing high and low bytes into a word of storage addressed by said storage address register and said high byte and low byte storage output gates being operable under control of said word indicating means for passing high and low bytes from a word of storage addressed by said storage address register, and
means for applying the storage address in storage address register at a predetermined time to said storage.

8. The apparatus of claim 7 further comprising means for entering a bit having a predetermined state into said shiftable storage address register as it is being shifted.

* * * * *